United States Patent
Wittenberg, Jr. et al.

(10) Patent No.: US 9,113,712 B2
(45) Date of Patent: Aug. 25, 2015

(54) METHOD AND SYSTEM FOR CONVERTING A RECLINER FROM MANUAL ACTUATION TO POWERED ACTUATION

(71) Applicant: Klaussner Furniture Industries, Inc., Asheboro, NC (US)

(72) Inventors: C. William Wittenberg, Jr., Asheboro, NC (US); Glenn Michael Kahn, Asheboro, NC (US)

(73) Assignee: Klaussner Furniture Industries, Inc., Asheboro, NC (US)

( * ) Notice: Subject to any disclaimer, the term of this patent is extended or adjusted under 35 U.S.C. 154(b) by 121 days.

(21) Appl. No.: 13/793,387

(22) Filed: Mar. 11, 2013

(65) Prior Publication Data

US 2014/0070588 A1    Mar. 13, 2014

Related U.S. Application Data

(60) Provisional application No. 61/700,156, filed on Sep. 12, 2012.

(51) Int. Cl.
| | |
|---|---|
| A47C 1/031 | (2006.01) |
| A47C 1/032 | (2006.01) |
| A47C 7/00 | (2006.01) |
| B23P 6/00 | (2006.01) |
| A47C 1/034 | (2006.01) |
| A47C 1/035 | (2006.01) |
| A47C 13/00 | (2006.01) |
| A47C 1/0355 | (2013.01) |

(52) U.S. Cl.
CPC ............... *A47C 1/032* (2013.01); *A47C 1/035* (2013.01); *A47C 1/0342* (2013.01); *A47C 1/0345* (2013.01); *A47C 1/0355* (2013.01); *A47C 1/03211* (2013.01); *A47C 7/00* (2013.01); *A47C 13/00* (2013.01); *B23P 6/00* (2013.01); *Y10T 29/49716* (2015.01)

(58) Field of Classification Search
None
See application file for complete search history.

(56) References Cited

U.S. PATENT DOCUMENTS

| | | |
|---|---|---|
| 4,852,939 A | 8/1989 | Krauska |
| 5,010,780 A | 4/1991 | Hatfield |
| 5,292,170 A | 3/1994 | LaPointe et al. |
| 5,294,179 A | 3/1994 | Rudes et al. |
| 5,927,144 A | 7/1999 | Koch |

(Continued)

OTHER PUBLICATIONS

International Search Report and Written Opinion of PCT/US13/59205; dated Feb. 10, 2014, 8 pgs.

*Primary Examiner* — David E Allred
(74) *Attorney, Agent, or Firm* — Womble Carlyle Sandridge & Rice, LLP (57) ABSTRACT

A method of converting a recliner from manual actuation to powered actuation that includes providing a recliner having a frame, a recliner mechanism with a base coupled to the frame and a hinged linkage movably coupled to the base, and a manual actuator that releases the hinged linkage to move under an occupant-applied force. The method also includes disconnecting and removing the manual actuator from the recliner and, without disassembly of the recliner mechanism from the frame, removing a spring assist device extending between the hinged linkage and the base, installing a drive unit to the recliner mechanism, installing a power actuator on the frame with electrical communication to the drive unit, and establishing electrical communication between the drive unit and a source of electrical power, so that activation of the power actuator causes the drive unit to move the hinged linkage under powered actuation.

8 Claims, 10 Drawing Sheets

(56) References Cited

U.S. PATENT DOCUMENTS

| | | | |
|---|---|---|---|
| 5,975,627 A * | 11/1999 | LaPointe et al. | 297/68 |
| 6,131,999 A | 10/2000 | Piekny et al. | |
| 6,590,364 B2 | 7/2003 | Rogers, III et al. | |
| 6,679,555 B2 | 1/2004 | Bangert | |
| 6,893,085 B2 | 5/2005 | LaPointe et al. | |
| 6,928,710 B2 | 8/2005 | Rogers et al. | |
| 2003/0047973 A1 * | 3/2003 | Pellerin | 297/260.2 |
| 2004/0256893 A1 * | 12/2004 | LaPointe et al. | 297/85 |
| 2006/0076813 A1 | 4/2006 | Mohn et al. | |
| 2007/0246986 A1 * | 10/2007 | White et al. | 297/344.1 |
| 2011/0198894 A1 | 8/2011 | Hsieh et al. | |

\* cited by examiner

METHOD AND SYSTEM FOR CONVERTING A RECLINER FROM MANUAL ACTUATION TO POWERED ACTUATION

CROSS RELATION TO PRIOR APPLICATIONS

This patent application claims the benefit of priority to U.S. Provisional Application No. 61/700,156, filed Sep. 12, 2012, which is incorporated herein by reference in its entirety.

TECHNICAL FIELD

The present disclosure generally relates to home furnishings, and in particular to recliner chairs and sofas.

BACKGROUND

Recliner chairs and sofas are popular furniture pieces found in many living rooms across the country, as they can provide a level of comfort and relaxation that is considered unmatched by traditional chairs and sofas by many users. Over the past several years, recliner chairs and sofas have continued to evolve towards larger and heavier models that provide greater cushioning and space for their occupants, often resulting in more complex and robust recliner mechanisms and frames needed to support and carry the additional weight. However, while the exterior and visible portions of reclining furniture continues to change, the underlying recliner mechanisms which elevate and carry the various support panels (i.e. the seat rest, the back rest, the foot rest, etc.) continue to be divided into two basic types; manual actuation and powered actuation.

Manually-actuated recliners are the more popular of the two types of recliners, primarily for cost and simplicity reasons. The number of recliner models that are originally manufactured for powered actuation are often only available in limited models, styles and sizes, and typically cost several hundreds of dollars more that manually-actuated models. Consequently, most recliner models are originally manufactured for manual actuation. Even if the model, style and size of a particular manually-actuated recliner includes an option for powered actuation, special modifications must be made at the factory prior to assembly to make the piece suitable for powered actuation. As a result, many recliner models with power actuation often require special ordering and extended wait times to before the furniture can be delivered to the point of sale.

There are times, however, when a customer may change his or her mind after ordering a lower-cost manually-actuated recliner, and wish instead to purchase the same recliner with powered actuation, and preferably for the same cost differential. Even if available, however, this change in the sales order may still result in additional costs and significant delivery delays, which may prompt the customer to cancel the sale altogether and purchase from another supplier. In other cases, the end user may change his mind after taking delivery and using the recliner for a period of time, and then decide that powered actuation is a preferred option and worth the additional cost. However, since the reclining furniture piece has already been delivered, the time, effort and cost to ship the recliner back to the factory for retrofitting to powered actuation, in addition to the cost of the conversion itself, is prohibitive.

Moreover, retail sellers often must pre-order either manual or powered recliners, where display floor space is limited. A customer may prefer a certain style that is only shown in manual configuration. Even if that style is available in a powered version (where often it is not), the customer is forced to wait 2-3 months for an eventual delivery. Such a delay can lead to customer frustration at the least and a lost sale at the worst. The retail seller lacks a method of converting on-site a manual recliner to a powered recliner.

Accordingly, it can be seen that a need exists for a method and apparatus for converting a recliner from manual actuation to powered actuation at a field or point-of-sale location that addresses the foregoing and various other related and unrelated problems in the art.

SUMMARY

In one representative embodiment of the disclosure, a method of converting a recliner from manual actuation to powered actuation that includes providing a recliner having a frame, a recliner mechanism with a base coupled to the frame and a hinged linkage movably coupled to the base, and a manual actuator that releases the hinged linkage to move under an occupant-applied force. The method also includes disconnecting and removing the manual actuator from the recliner and, without disassembly of the recliner mechanism from the frame, removing a spring assist device extending between the hinged linkage and the base, installing a drive mechanism to the recliner mechanism, installing a power actuator on the frame with electrical communication to the drive mechanism, and establishing electrical communication between the drive mechanism and a source of electrical power, so that activation of the power actuator causes the drive unit to move the hinged linkage under powered actuation.

In another representative embodiment of the disclosure, a system providing for the field conversion of a recliner from manual actuation to powered actuation. The system includes a series of recliner furniture pieces, with each recliner furniture piece having at least one seat frame with a control aperture formed therein, a recliner mechanism mounted within the seat frame and having a base and a hinged linkage that is movably coupled to the base, a seat rest and a back rest coupled to the hinged linkage, one or more spring assist devices configured to assist with actuating the hinged linkage under the influence of an occupant-applied force, and a manual actuator adapted for mounting within the control aperture and extending to the recliner mechanism. In addition, actuation of the recliner mechanism by the occupant-applied force causes the seat rest and the back rest to assume a reclining orientation.

The system further includes a powered actuation kit comprising a drive mechanism configured to actuate the hinged linkage upon connection to a source of electrical power, and a power actuator adapted for mounting within the control aperture and extending to the drive mechanism. Furthermore, the seat frame and the recliner mechanism are pre-configured to accept the powered actuation kit without disassembly of any of the recliner mechanism, the frame, or the recliner mechanism from the frame.

In another aspect of the disclosure, a component kit for converting a recliner from manual actuation to powered actuation, wherein the recliner includes a frame, a recliner mechanism having a base coupled to the frame and a hinged linkage movably coupled to the base, and a manual actuator mounted within an control aperture in the frame and configured to release the hinged linkage to move from a first position to a second position relative to the base and frame by way of an occupant-applied force. The component kit includes a drive mechanism configured to actuated the hinged linkage from the first position to the second position upon connection to a source of electrical power, a means for coupling the drive mechanism to the base, an electrical transformer connectable between the drive mechanism and a source of electrical power and configured to provide electrical power to the drive mechanism, and a power actuator connectable with the drive mechanism and configured to activate the drive mechanism.

BRIEF DESCRIPTION OF THE DRAWINGS

Various features, aspects and advantages of the present disclosure will become apparent when the following detailed description is taken in conjunction with the accompanying drawings. It will be readily appreciated, however, that these drawings merely depict representative embodiments of the present disclosure and are not to be considered limiting of its scope, and that the various components of the disclosure illustrated in the drawings could be arranged and designed in a variety of different configurations. Nonetheless, the present disclosure will be described and explained with additional specificity and detail through the use of the accompanying drawings, wherein the elements and features of the illustrated embodiments are designated by numerals throughout, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following description, in conjunction with the accompanying drawings described above, is provided as an enabling teaching of exemplary embodiments of the present disclosure. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the disclosure. Thus, the following description shall be interpreted as illustrative of the principles of the embodiments and not in limitation thereof, since the scope of the invention is defined by the claims.

Figure 1A:
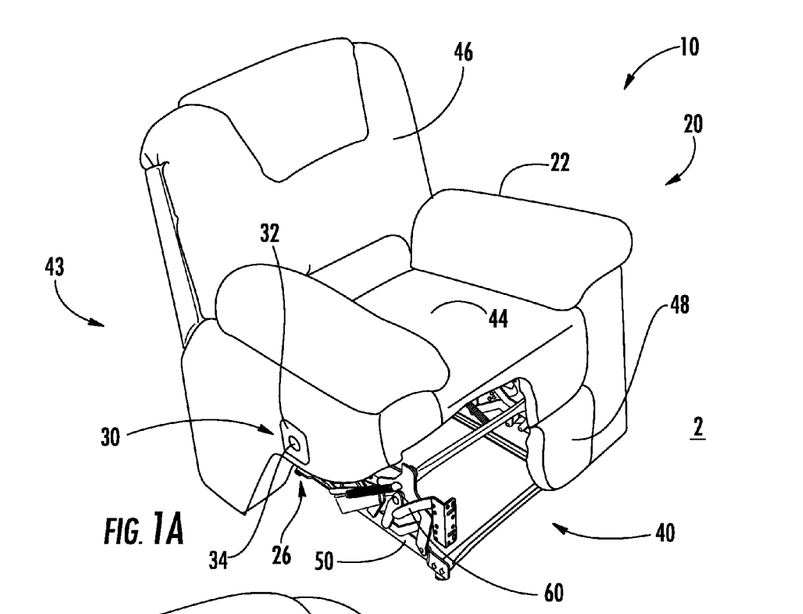
FIGS. 1A-1B are cut-away perspective views of a recliner chair configured for manual actuation between upright and reclined positions, respectively, in accordance with a representative embodiment of the present disclosure.
Figure 1B:
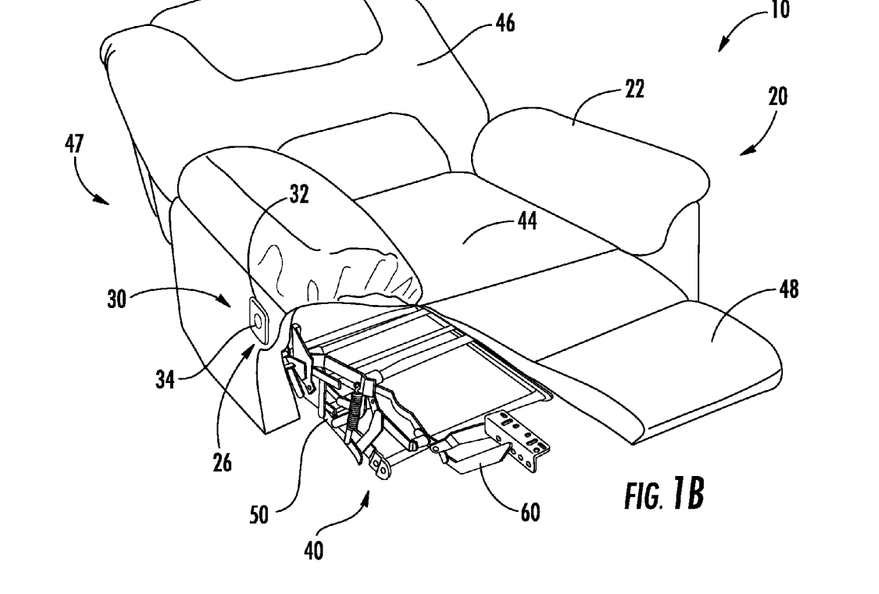

Referring now to the drawings in which like numerals indicate like parts throughout the several views, FIGS. 1A and 1B generally illustrate one embodiment of a reclining furniture piece or recliner, namely recliner chair 10, oriented in an closed, upright position 43 (FIG. 1A) and in an open, reclined position 47 (FIG. 1B). The recliner chair 10 has been made in accordance with the present disclosure, and includes a frame 20 having at least two side supports 22 which comprises the visible, non-reclining portions of the furniture piece 10. A recliner mechanism 40 is installed or mounted within the frame 20, and includes a base 50 and a hinged linkage 60. The base 50 of the recliner mechanism 40 is rigidly coupled to the frame 20 and, in one aspect, can support the frame 20 above the floor 2. The hinged linkage 60 is movably coupled to base 50. In turn, a seat rest 44, a back rest 46 and a foot rest 48 are attached to and carried by the hinged linkage 60.

The frame 20, the seat rest 44, the back rest 46, and the foot rest 48 can all be upholstered with matching fabric and/or material to give the appearance of common construction, even though the seat rest 44, the back rest 46, and the foot rest 48 are not originally formed as parts of the frame 20 nor are they directly coupled or attached to the frame 20. Generally, the recliner mechanism 40, with its base 50 and hinged linkage 60, can be manufactured separately and installed to the frame 20 during assembly of the recliner chair 10. In addition, while the frame 20, seat rest 44, the back rest 46, and the foot rest 48 are generally made of wooden frameworks covered with padding and fabric, the recliner mechanism 40 is generally made of rigid bars or plates made from metal, such as steel or aluminum, and joined together with welding, fasteners or heavy-duty pivot joints so as carry the weight of the other chair components and any occupants ensconced therein.

The recliner chair 10 also includes a manual actuator 30 that is coupled between the frame 20 and the recliner mechanism 40. Generally, the manual actuator 30 includes an actuator housing 32 installed into an aperture 26 formed through one of the side supports 22 of the frame 20. An actuator cable (not shown) leads from a control mechanism 34, such as a release button or pull-out lever, supported in the actuator housing 32, through the interior of the frame 20 to a latch device located on the recliner mechanism 40. Operating the control mechanism 34 releases the latch device on the recliner mechanism 40 so that the hinged linkage 60 is free to moved from the closed, upright position 43 (FIG. 1A) to the opened, reclined position 47 (FIG. 1B), and vice versa, by way of a manually-applied force. Thus, the recliner chair 10 is a manually-actuated reclining furniture piece because the recliner mechanism 40 is moved between positions 43, 47 by the manual application of a force that is typically generated by the occupant by leaning back on the back rest 46 to open the recliner 10, or by leaning forward on the seat rest 44 to close the recliner 10.

Figure 2A:
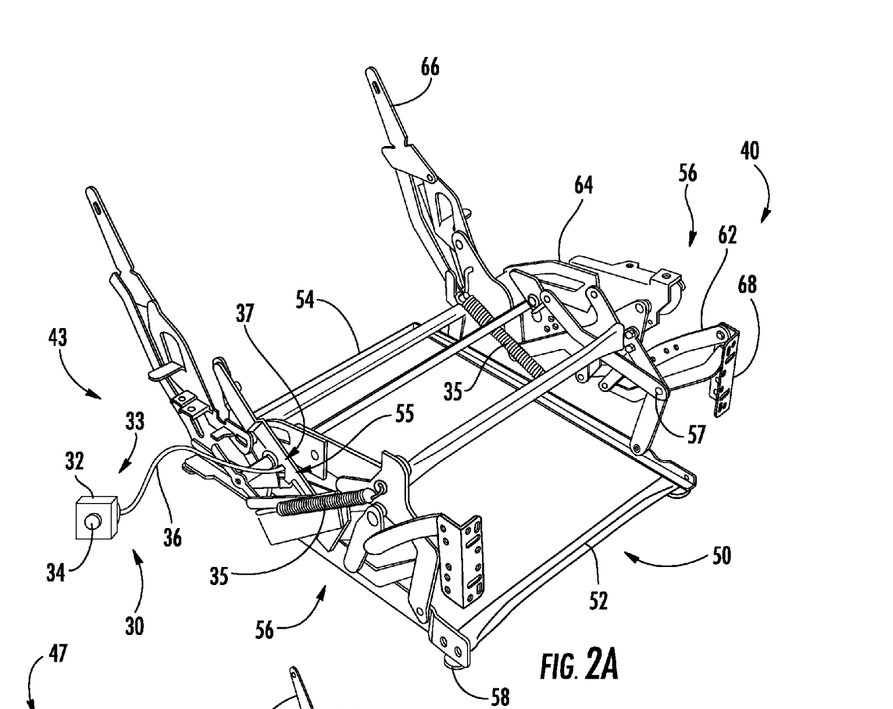
FIGS. 2A-2B are perspective views of the recliner mechanism of FIGS. 1A-1B.
Figure 2B:
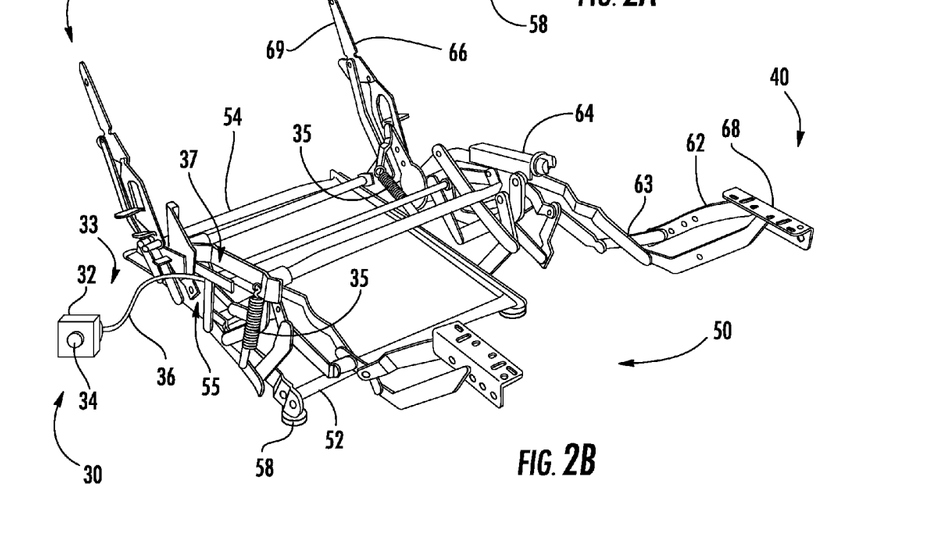

FIGS. 2A and 2B are perspective views of a representative embodiment of the manually-actuated recliner mechanism 40 of FIGS. 1A-1B, and provide more detail of the inner workings the base 50 and the hinged linkage 60. As can be seen, the base 50 can include a forward strut 52 and a rear strut 54 which are joined together by side brace structures 56. Each of the side brace structures 56 includes multiple rotating pivoting points 57 for the hinged linkage 60, and at least one of the side brace structures can include a latch device 55 which locks the hinged linkage 60 into either the closed position 43 (FIG. 2A) or the open position 47 (FIG. 2B) relative to the base 50. Other struts and cross-bracing members are also possible. The base 50 of the recliner mechanism may be coupled to the frame of the recliner with connection bars (not shown), and the bottom surfaces of the struts 52, 54 and/or side bracket structures 56 can include floor pads 58 which provide a non-marking or non-skid contact surface with the floor 2.

The hinged linkage 60 of the recliner mechanism 40 includes a plurality of support bars 62 connected together at various points by hinges or pivots 63. In the illustrated embodiment, the hinged linkage 60 further includes seat brackets 64, back brackets 66 and foot rest brackets 68 for supporting the seat rest 44, back rest 46 and foot rest 48 shown in FIGS. 1A-1B above. However, the recliner mechanism 40 of the present disclosure is not limited to the illustrated design, and can include a variety of hinged linkage 60 configurations, includes those without foot rest brackets (see FIG. 6), or those in which the seat rest is not configured for movement with the hinged linkage and is instead attached to the side support of the frame, and the like.

The interconnection between the manual actuator 30 and the recliner mechanism 40 is also shown in FIGS. 2A-2B. As discussed above, the manual actuator 30 can include a control mechanism 34 mounted within an actuator housing 32 located at a first end 33 of the manual actuator 30. An actuator cable 36 feeds from the actuator housing 32 towards the recliner mechanism 40, where a hook (not shown) located at the second end 37 of the manual actuator 30 connects with the latch device 55 located on one of the side brace structures 56. In the illustrated embodiment, activation of the control mechanism 34 releases the latch device 55 so that the hinged linkage 60 is free to moved from the closed, upright position 43 (FIG. 2A) to the opened, reclined position 47 (FIG. 2B), and vice versa, by way of the occupant-applied force.

The manually-actuated recliner can further include one or more spring assist devices, such as coil springs 35, which can apply tension between the hinged linkage 60 and the base 50 of the recliner mechanism 40 to assist with the closing and/or opening of the recliner, depending on the design and configuration of the recliner mechanism. In the embodiment shown in FIGS. 2A and 2B, the recliner mechanism includes three coil springs 35. As appreciated by one of skill in the art, other types of spring assist devices may also be included within the manually-actuated recliner mechanism to assist with the closing and/or opening of the recliner chair, including leaf springs, spiral wound springs, pneumatic springs and the like.

Illustrated in FIGS. 3A-3H is a method of converting or retrofitting the manually-actuated recliner 10 described above from manual actuation to powered actuation. The conversion process can be performed in a non-factory or field location, such as at the point of sale or retail location, and by employees or other personnel generally untrained in the manufacture, construction and precision assembly of recliner furniture. Moreover, the method does not require the disassembly of the recliner mechanism 40 from the frame 20 or the permanent modification of the frame 20 or recliner mechanism 40 so as to accept the powered actuation components, as with other conversion processes currently practiced in the prior art, or even the removal of the seat rest 44, the back rest 46, or the foot rest 48 from the recliner mechanism 40. As described in more detail below, the method illustrated in FIGS. 3A-3H can also be accomplished with simple tooling, such as with screwdrivers and wrenches, and with all of the necessary components being included in pre-package conversion kits.

Figure 3A:
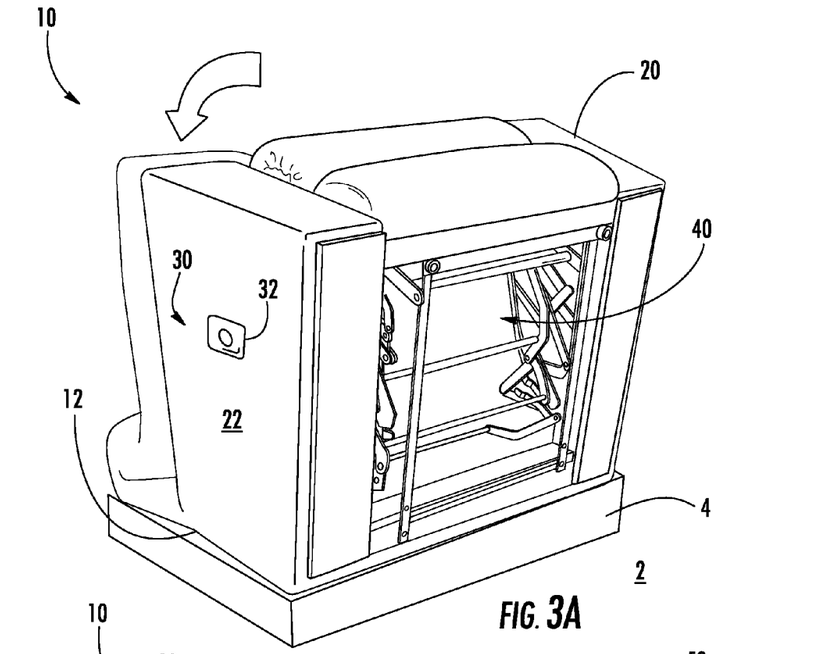
FIGS. 3A-3H are cut-away perspective views of the manually-actuated recliner of FIGS. 1A-1B being converted to powered actuation.
Figure 3B:
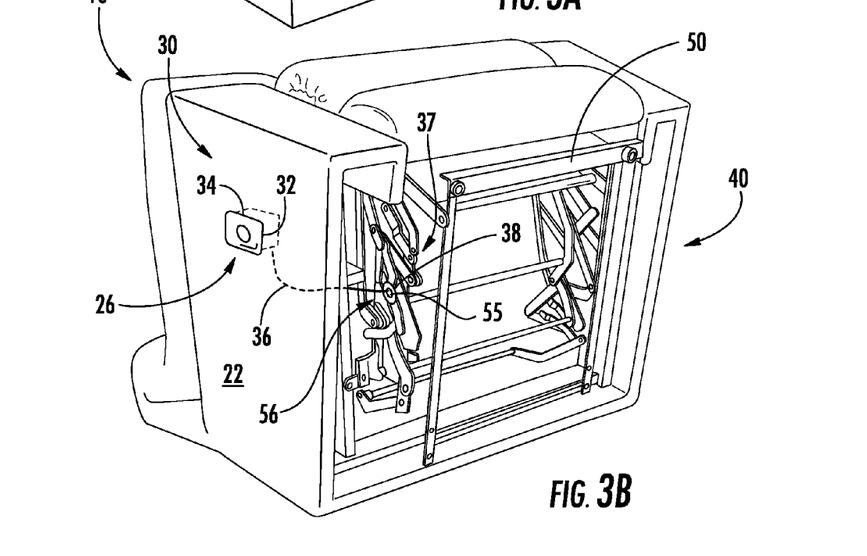

As shown in FIG. 3A, the back 12 of the recliner 10 can flipped or rotated onto the floor 2 or onto a raised horizontal working surface 4 to provide access to the frame 20 and recliner mechanism 40 from the bottom of the recliner 10. The manual actuator housing 32 at the first end 33 of the actuator cable 36 can then be removed from the aperture 26 formed into one of the side panels 22 of the frame 20, as shown in FIG. 3B. This can typically be accomplished by removing screws which secure the manual actuator housing 32 to the side panel 22. A hook portion 38 at the second end 37 of the actuator cable 36 can also be disconnected from the latch device 55 that is generally located on the nearest side brace structure 56. Once the hook portion 38 has been disconnected from the latch device 55, the cable 36 can be withdrawn through the aperture 26 and the entire manual actuator assembly 30 removed from the recliner 10.

As stated above, the following steps in the method of converting or retrofitting the recliner 10 described above from manual actuation to powered actuation can be accomplished without disassembly of the recliner mechanism 40 from the frame 20. The method can also be accomplished without the need for permanent modification of the frame 20 or recliner mechanism 40 so as to accept the powered actuation components. For instance, it is not necessary to modify the aperture 26 that is located in the side support 22 of the frame 20 to accept the housing of a power actuator having different outer dimensions or a different shape.

Figure 3C:
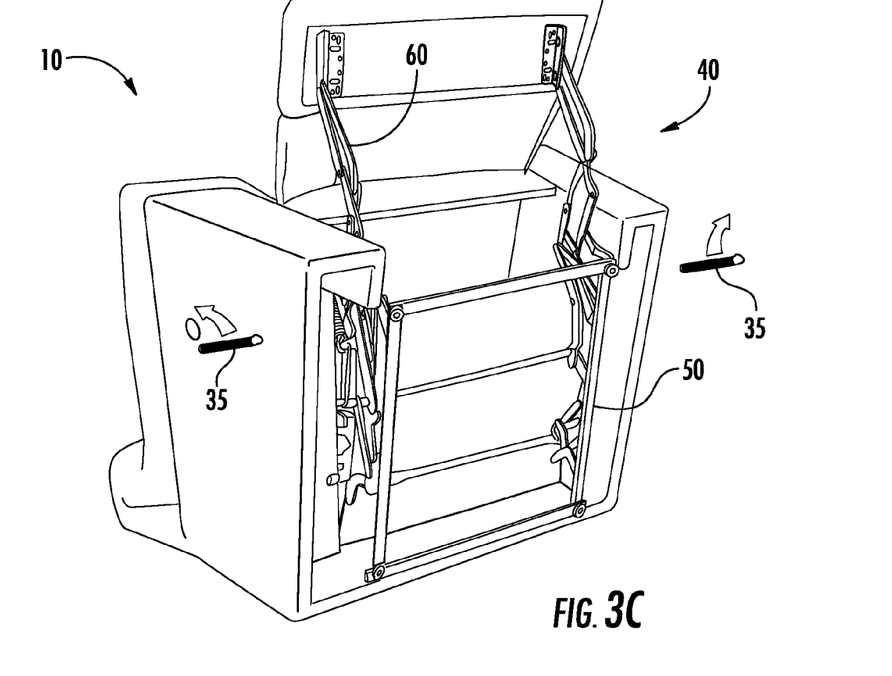
Figure 3D:
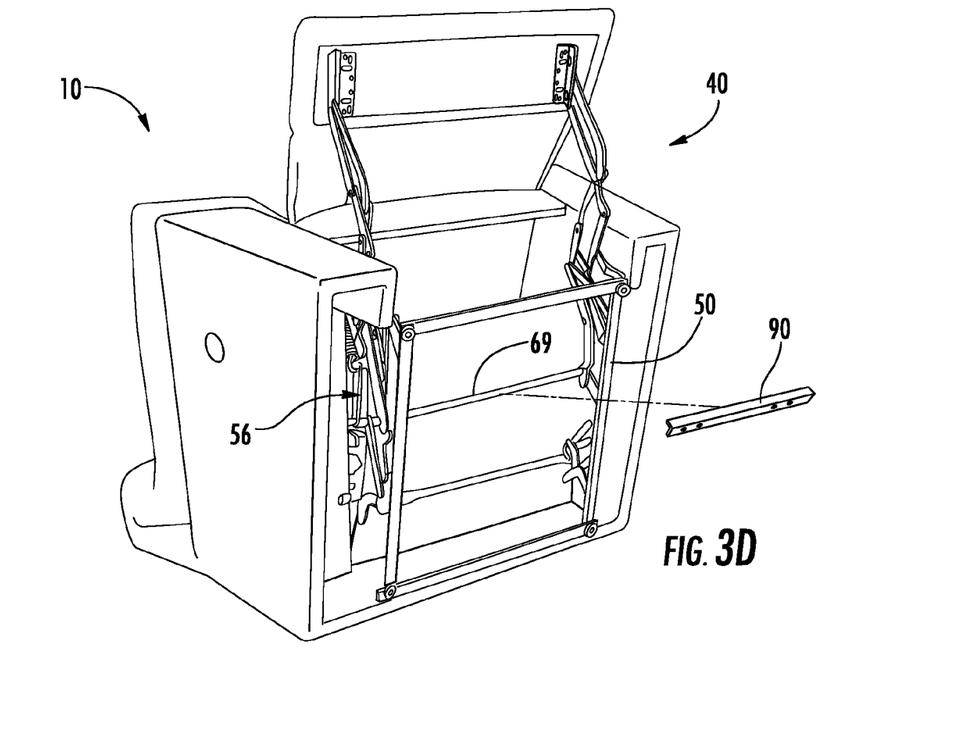

With reference to FIG. 3C, one or more spring assist devices, such as coil springs 35, can be removed from between the base 50 and hinged linkage 60 as they are no longer needed to assist with the opening and closing of the recliner mechanism 40. Depending on the configuration of the recliner mechanism 40, the hinged linkage 60 may be manipulated into the open position prior to removing the springs 35, as this can place the springs 35 in a non-stretched state that makes them easier to remove.

With reference to FIG. 3D, and again depending on the configuration of the recliner mechanism 40, an angle bracket 90 can be mounted to a movable drive strut 69 that extends between the side brackets 56 of the recliner mechanism at a height above the base 50 and below the seat brackets 44 (e.g. when the recliner mechanism is in an upright position, as in FIGS. 2A, 2B). The drive strut 69 is coupled to the hinged linkage 60 in a way that movement of the drive strut 69 causes the hinged linkage 60 to extend or retract. In addition, the drive strut may be movable through translation, through rotation, or both. The angle bracket 90 can be attached to the movable drive strut 69 with fasteners, such as nuts and bolts, machine screws, self-tapping screws, and the like, and can include provision for coupling the drive mechanism to the drive strut 69. As shown, the hinged linkage 60 may again be manipulated into the open position to provide easier access to the drive strut 69 by moving various components of the hinged linkage 60 out of the way.

Figure 3E:
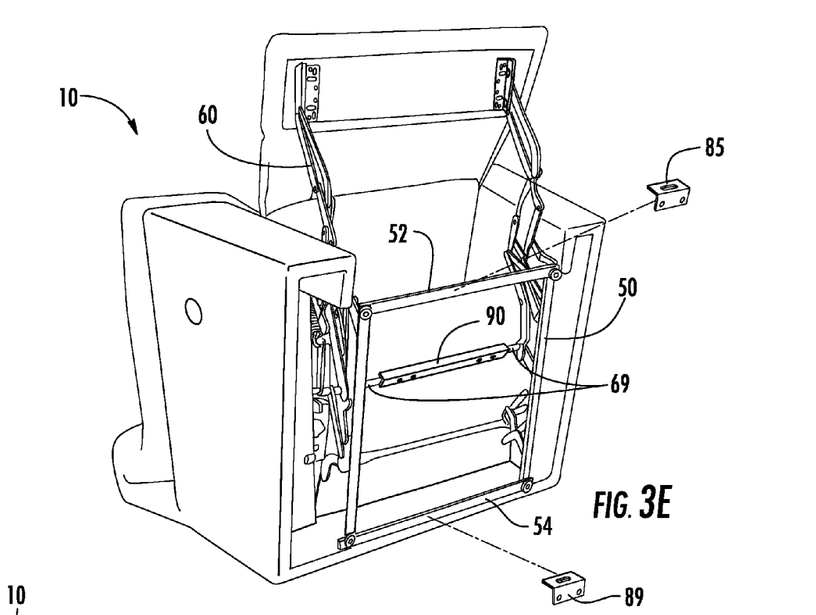

With reference to FIG. 3E, a front bracket 85 can be attached to the forward strut 52 of the base 50, and a rear bracket 89 can be attached to a rear strut 54 of the base 50 as means for coupling the drive mechanism to the frame. The front bracket 85 and the rear bracket 89 include provision for securing the two ends of the drive mechanism to the stationary base 50 of the recliner mechanism 40. In the embodiment illustrated, for instance, the front bracket 85 and rear bracket 89 can be clamp-type brackets, and can operate to clamp and hold the ends of the drive mechanism to the forward strut 52 and rear strut 54, respectively. Accordingly, the front bracket 85 and rear bracket 89 may first be attached to their respective struts with loosely-tightened fasteners. The fasteners can then be completely tightened after the ends of the drive mechanism have been placed within the brackets 85, 89 and a movable swing arm 92 of the drive mechanism has been at least loosely coupled to the drive strut 69/angled bracket 90 in a like manner.

In an alternative embodiment, the step of adding a front bracket 85 and a rear bracket 89, as shown in FIG. 3E can be omitted. In this alternative embodiment, the drive mechanism can have front and rear mounts pre-attached to the front portion 83 and rear portion 87 of the drive mechanism 80 respectively. The pre-attached front and rear mounts provide an alternative means for coupling the drive mechanism to the frame. The pre-attached mounts will allow the drive mechanism to be bolted directly to the frame.

Figure 3F:
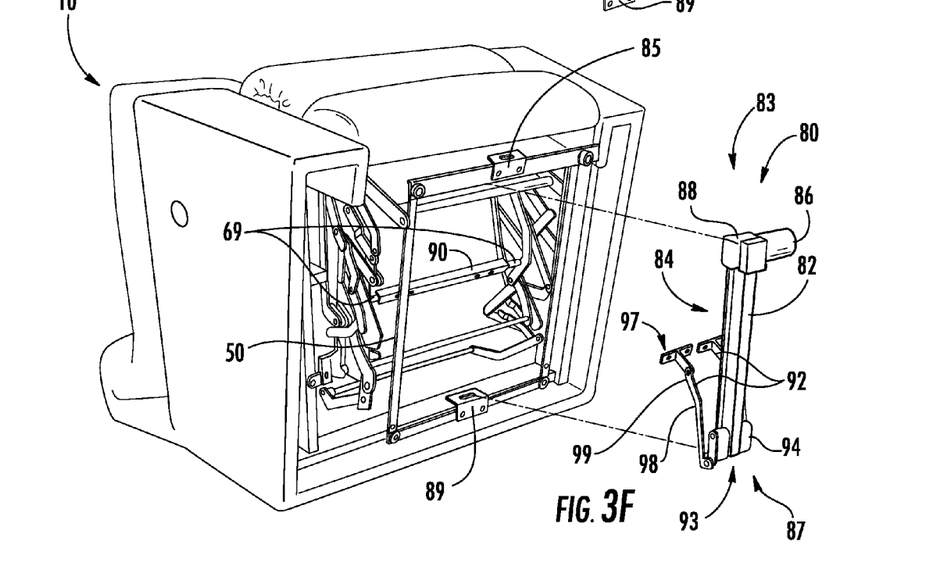

At this point, as shown in FIG. 3F, the recliner or recliner chair 10 is prepared to receive the drive mechanism 80. In the illustrated embodiment of the present disclosure, the drive mechanism 80 can comprise a slide rail 82 having a front portion 83 and a rear portion 87. A drive screw 84 is mounted proximate or interior to the slide rail 82. A motor drive unit, comprising a motor drive 86 and a gear reducer 88, is attached to the front portion 83 of the drive rail 82, with the gear reducer 88 having an input end coupled to the motor drive 86 and an output end coupled to the drive screw 84, so that activation of the motor drive causes the drive screw 84 to rotate within the slide rail 82.

The drive mechanism 80 further includes a carriage 94 that is slidably mounted on the slide rail 82 and coupled with the drive screw 84, so that rotation of the drive screw 84 causes the carriage 94 to translate back and forth along the slide rail 82. Extending upward from the carriage (again, when the chair is in an upright position) are one or more swing arms 92, each having a lower end 93 coupled to the carriage 94 and an upper end 97 coupled to the drive strut 69 or angle bracket 90. Furthermore, the swing arms 92 can each comprise a plurality of drive bars 98 rotatably connected together by one or more pivot joints 98. This linked assembly of drive bars 98 can allow for the upper ends 97 of the swing arms 92 to rotate around the drive strut 69 even as the linear motion of the carriage 94 and the lower ends 93 of the swing arms 92 along the slide rail 82 causes the swing arms 92 to move/rotate the drive strut 69. In turn, the movement or rotation of the drive strut 60 causes the hinged linkage 60 to extend to an open position or retract to the closed position, depending on the direction of movement or rotation.

Figure 3G:
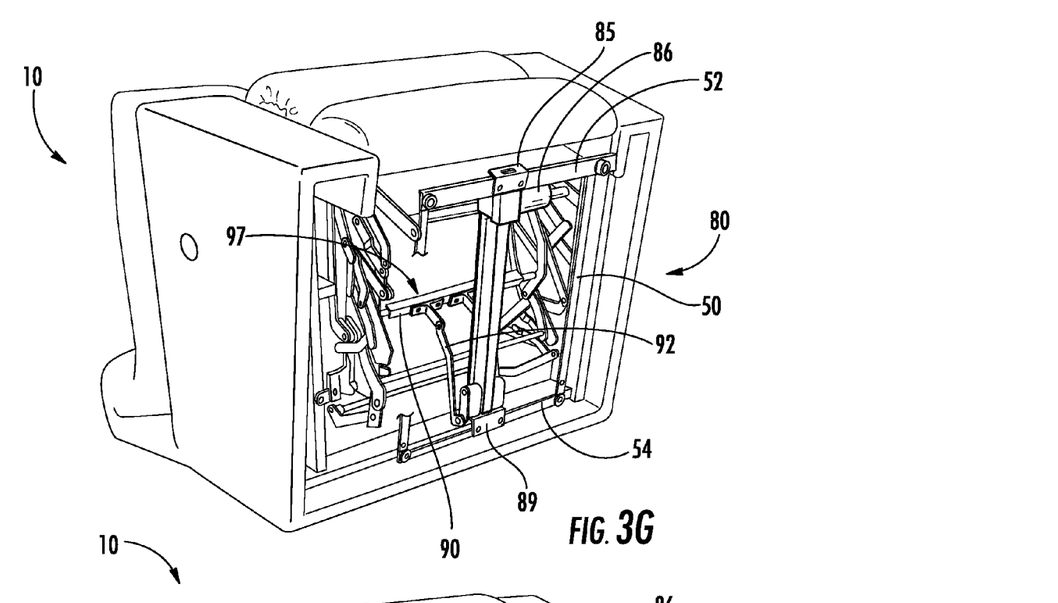

The drive mechanism 80 can be mounted to the recliner mechanism 40 by placing the rear portion 87 of the slide rail 82 into the rear bracket 89 and the front portion 83 of the slide rail 82 into the front bracket 85. The drive mechanism 80 can be held loosely in place by the front bracket 85 and rear bracket 89 until the upper ends 97 of the swing arms 92 can be attached to the drive strut 69/angle bracket 90 with additional fasteners, as shown in FIG. 3G. At this point, each of the fasteners which hold the brackets 85, 89, 90 to their respective struts 52, 54, 69, can be tightened to secure the drive mechanism 80 underneath the hinged linkage 60 and extending from the front strut 52 to the rear strut 54 of the recliner mechanism 40.

In the alternative embodiment, where the front 85 and rear 89 brackets are omitted, the drive mechanism 80 can be coupled to the recliner mechanism 40 by bolting a front mount (not shown), disposed on the front portion 83 of the drive mechanism 80, to the front strut 52 and by bolting a rear mount (not shown), disposed on the rear portion 87 of the drive mechanism 80, to the rear strut 54. As when using the respective brackets 85, 89, the mounts may be loosely held in place prior to being tightened once the upper ends 97 of swing arms 92 are connected to angle bracket 90.

Figure 3H:
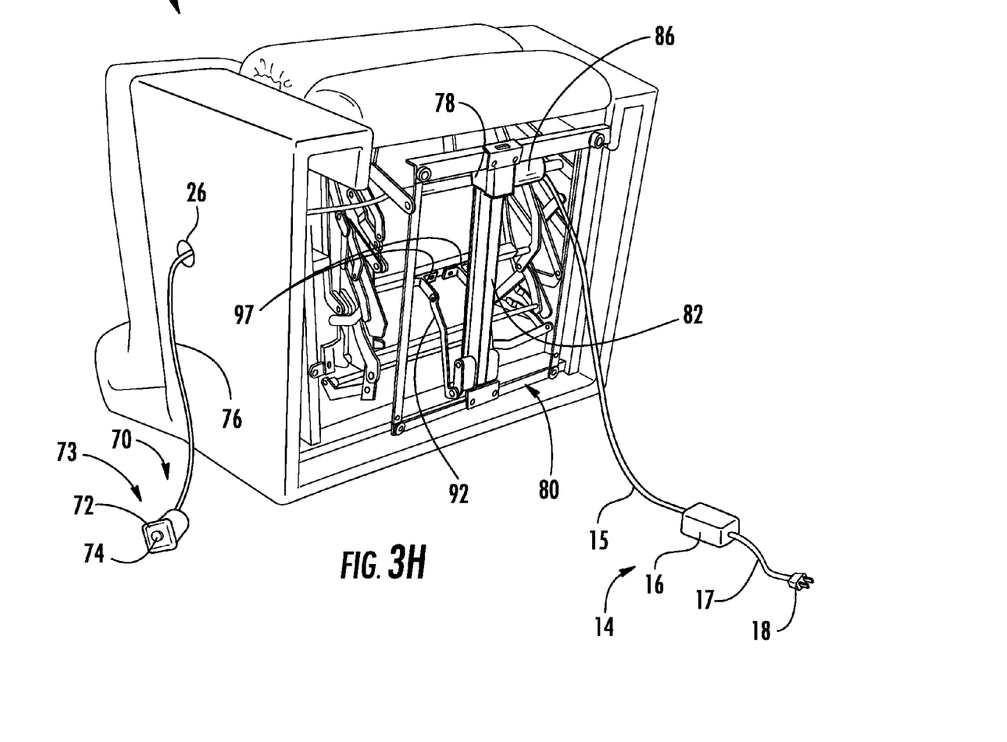

With reference to FIG. 3H, a power actuator 70 can now be installed to the recliner 10. This can be accomplished by threading the second end 77 of a power actuator communications cable 76 through the aperture 26 in the side support 22 of the frame. A power actuator housing 72 located at the first end 73 of the communications cable 76 has substantially the same footprint or outer dimensions as the manual actuator housing that was removed from the control aperture in FIG. 3B above, and can be installed into the aperture 26 using the same mounting screws removed from the manual actuator housing. Attaching a connector 78 located at the second end 77 of the communications cable to the motor drive 86 establishes electrical communication between the motor drive 86 and an actuator control 74 located in the power actuator housing 72 at the first end 73 of the communications cable 76. The actuator control 74 may comprise dual push buttons. Depressing the first push button could open the drive mechanism 80 while depressing the second push button could close the drive mechanism 80.

A power cable 14 having a plug end 18 for connecting the drive mechanism 80 with a source of electrical power can be installed to complete the conversion. As shown in FIG. 3H, the power cable 14 can include a transformer 16 which is electrically connected to the motor drive 86 with electrical cable 15, and a power cord 17 having the plug 18 for connection to an electrical outlet providing electricity, typically at residential voltage levels. The transformer 16 can step down the voltage from the electrical outlet to a voltage level suitable for use by the motor drive 86.

Figure 4A:
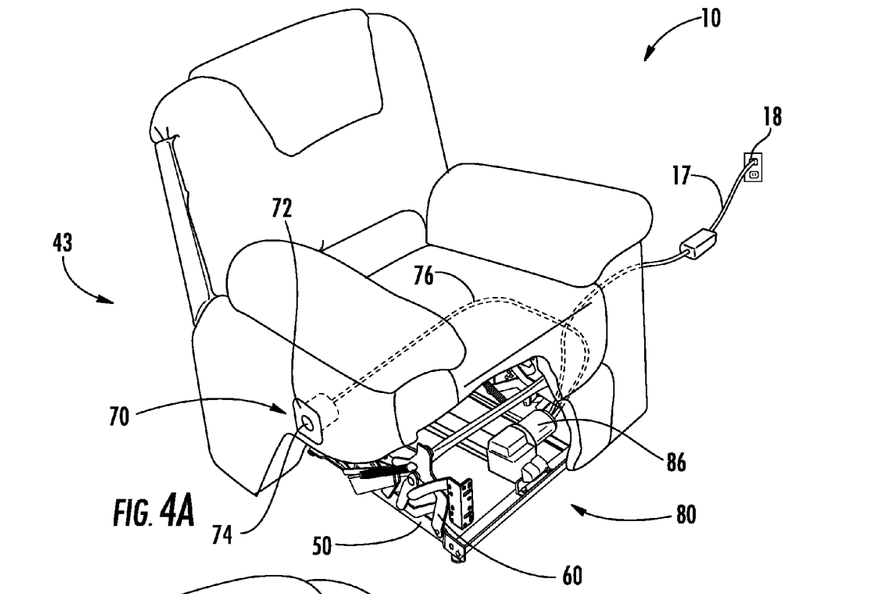
FIGS. 4A-4B are cut-away perspective views of the recliner of FIGS. 1A-1B in an upright and reclined positions, respectively, and after conversion to powered actuation.
Figure 4B:
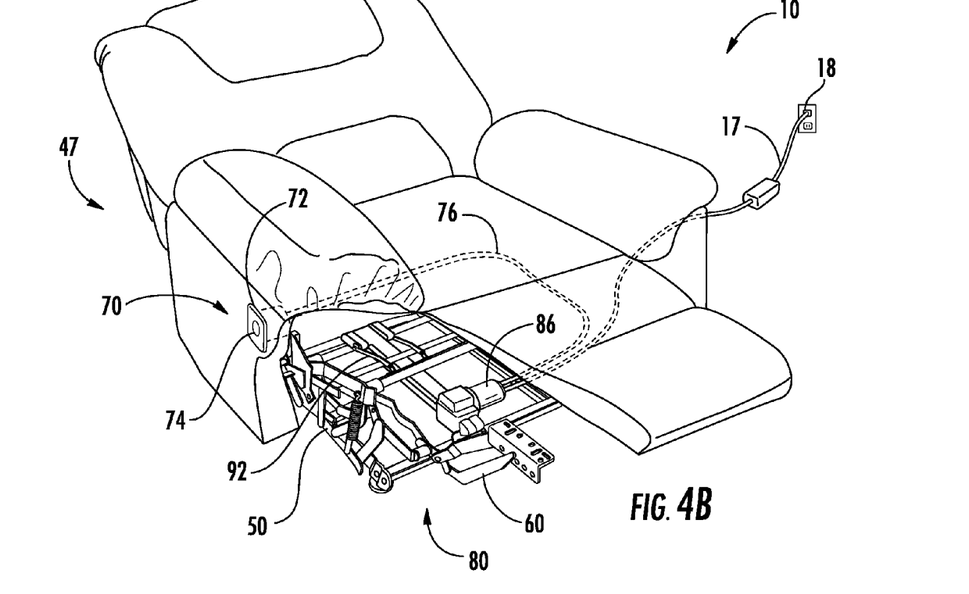

The converted recliner or recliner chair 10 can then be returned to the upright position and closed position 43, as shown in FIG. 4A. At this point, connection of the plug end 18 of the power cord 17 to a typical power outlet 8 provides power to the power actuator 70, so that activation of the actuator control 74 located within actuator housing 72 in a first direction directs electrical power to the motor drive unit to activate the motor drive 86. The motor drive 86 rotates the drive screw (not shown) located within the slide rail 82 in a first direction, and causes the carriage to translate forwardly along the slide rail and thereby drive the swing arms to move/rotate the drive strut and open the hinged linkage 60 to the open and extended position (FIG. 4B). Activating the actuator control 74 in a second direction reverses the power to the motor drive 86 and the direction of rotation of the drive screw, and causes the carriage to translate rearwardly along the slide rail and thereby pull backward on the swing arms to move/rotate the drive strut 69 in the opposite direction and close the hinged linkage 60 (FIG. 4A).

Figure 5:
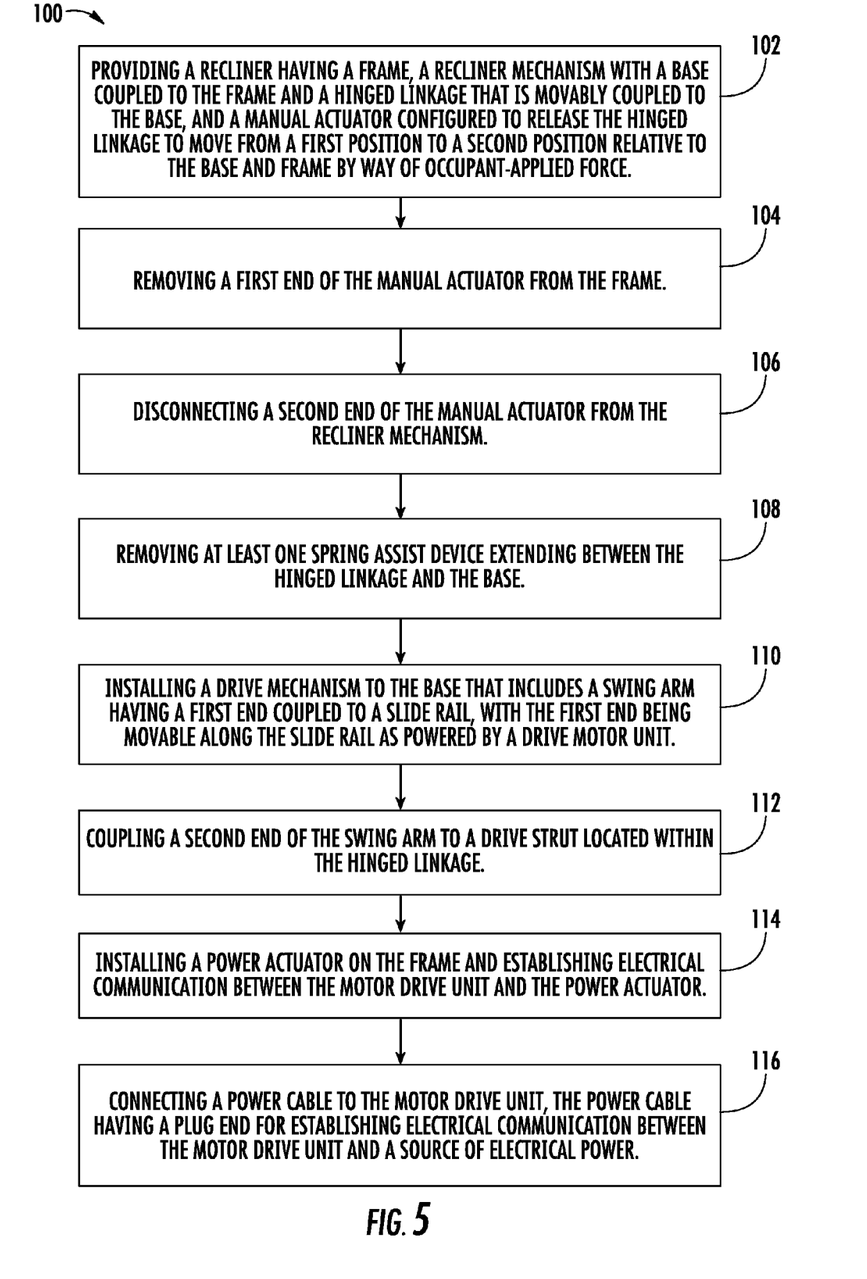
FIG. 5 is a flowchart depicting a method for converting a recliner from manual actuation to powered actuation, in accordance with yet another embodiment of the present disclosure.

FIG. 5 is a flowchart depicting a method 100 for converting a recliner from manual actuation to powered actuation, in accordance with yet another embodiment of the present disclosure. The method 100 generally includes the steps of providing 102 a recliner having a frame, a recliner mechanism having a base coupled to the frame and a hinged linkage that is movably coupled to the base, and a manual actuator that is configured to release the hinged linkage to move from a first position to a second position relative to the base and frame by way of occupant-applied force. The method also includes removing 104 a first end of the manual actuator from the frame and disconnecting 106 a second end of the manual actuator from the recliner mechanism. Without disassembly of the recliner mechanism from the frame, the method further includes removing 108 at least one spring assist device extending between the hinged linkage and the base, installing 110 a drive mechanism to the base that includes a swing arm having a first end coupled to a slide rail, with the first end being movable along the slide rail as powered by a motor drive unit, and coupling 112 a second end of the swing arm to a drive strut located within the hinged linkage. The method 100 further includes installing 114 a power actuator on the frame and establishing electrical communication between the motor drive unit and the power actuator, and connecting 116 a power cable to the motor drive unit, the power cable having a plug end for establishing electrical communication between the motor drive unit and a source of electrical power, and wherein activation of the power actuator causes the motor drive unit to actuate the swing arm relative to the slide rail and moved the hinged linkage from the first position to the second position by way of powered activation.

Although the steps of the one or more methods disclosed above for converting a recliner from manual actuation to powered actuation are provided in one or more exemplary sequences, it is to be appreciated that the steps are not limited to the order presented, and may be executed in any alternative sequence considered beneficial or necessary by a user of the present disclosure. In addition, any steps recited in any method or process claims may also be executed in any sequence and are not limited to the order presented in the claims.

Figure 6:
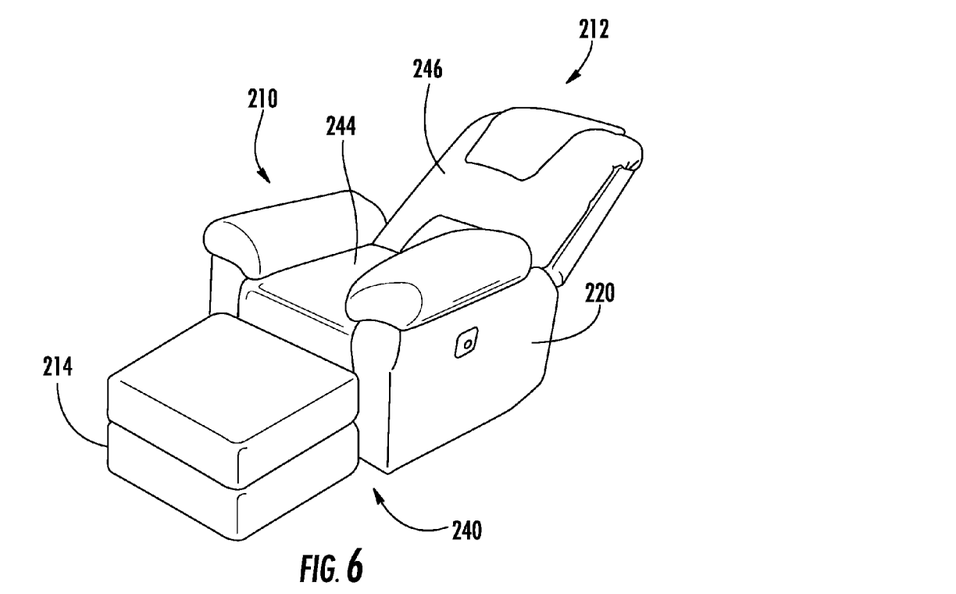
FIG. 6 is a perspective view of a recliner chair in a reclined position, in accordance with another embodiment of the present disclosure.
Figure 7:
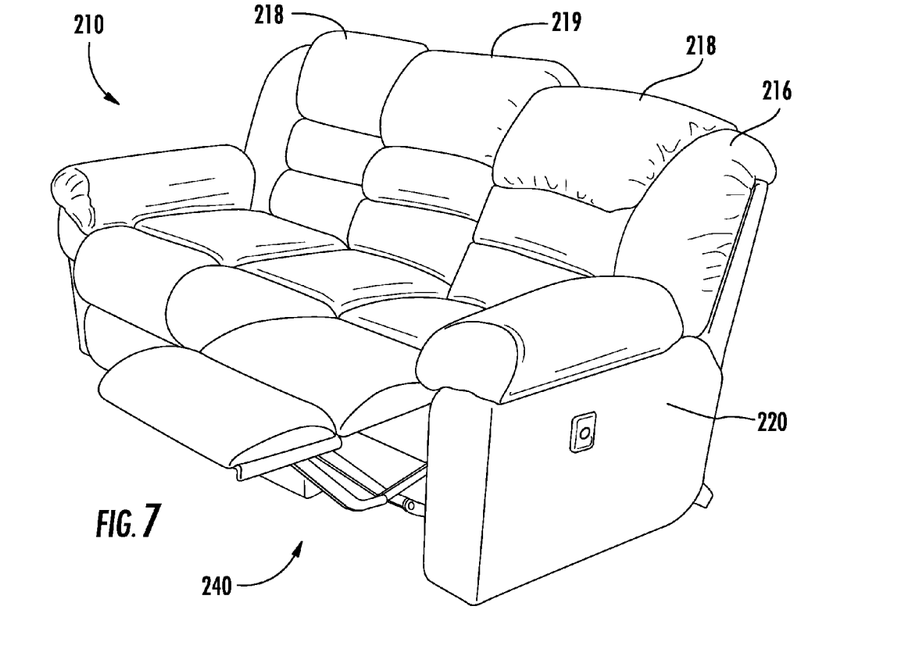
FIG. 7 is a perspective view of a recliner sofa in a reclined position, in accordance with yet another embodiment of the present disclosure.

The recliner of the present disclosure can be included in a series of recliner furniture pieces having variations on both the frame 220 and recliner mechanism 240 portions of the recliner, yet still have enough common characteristics between the frame 220 and the recliner mechanism 240 that allow for the field conversion from manual actuation to powered actuation. For instance, as illustrated in FIG. 6, the recliner 210 may comprise another recliner chair variation 212 that uses a separate ottoman furniture piece 214 as a foot rest, so that the recliner mechanism 240 enclosed therein only reclines a back rest 246 relative to a seat rest 244. And as illustrated in FIG. 7, the recliner 210 may also comprise a recliner sofa 216 having one or more reclining section 218 surrounding a non-reclining center section 219.

As stated above, the field conversion of either the chair recliner 212 or one or more of the reclining sections 218 of the recliner sofa 216 does not require the disassembly of the recliner mechanism 240 from the frame 220 or the permanent modification of the frame 220 or recliner mechanism 240 so as to accept the powered actuation components, and can be performed by employees or other personnel generally untrained in the manufacture, construction and precision assembly of recliner furniture.

Figure 8:
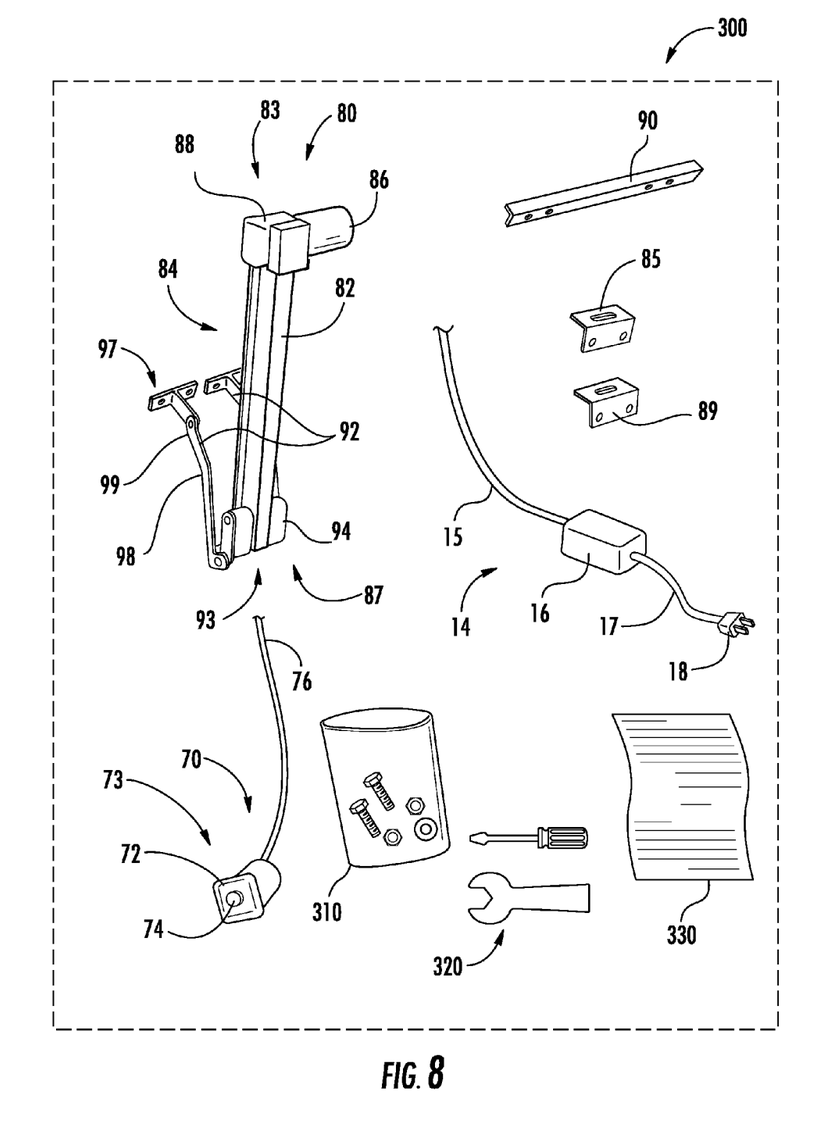
FIG. 8 is a schematic showing the contents of an exemplary pre-packaged conversion kit in accordance with the present disclosure.

All the necessary components for converting the recliners 10, 210 from manual actuation to powered actuation can be provided in pre-packaged powered conversion kits 300. As shown in FIG. 8, the conversion kits 300 may include a drive mechanism 80 configured to actuate the hinged linkage upon connection to a source of electrical power, an power cord 14 connectable between the drive mechanism and a source of electrical power and configured to provide electrical power to the drive mechanism and a power actuator 70 adapted for mounting within the aperture and extending to the drive mechanism.

Referring still to FIG. 8, an exemplary embodiment of the present disclosure the drive mechanism 80 included in the pre-packaged power conversion kit can comprise a slide rail 82, one or more swing arms 92 having lower ends that are movably coupled to the slide rail 82 and upper ends adapted for connection to the hinged linkage 60 of the recliner mechanism 40, a motor drive unit, and a drive screw proximate the slide rail 82 which is coupled to both motor drive unit and the lower ends of the swing arms. The motor drive unit can comprise a motor drive 86 and a gear reducer 99. Activation of the motor drive unit rotates the drive screw to cause the lower end of the swing arm 92 to move relative to the slide rail 82.

Further, the power cord 14 included in the exemplary pre-packaged conversion kit 300 can include a plug 18 for connecting the drive mechanism 80 with a source of electrical power, a transformer 16 to be electrically connected to the motor drive 86 with electrical cable 15, and a power cord 17 having the plug 18 for connection to an electrical outlet providing electricity, typically at residential voltage levels. The transformer 16 can step down the voltage from the electrical outlet to a voltage level suitable for use by the motor drive 86.

Moreover, power actuator 70 included in the exemplary pre-packaged power conversion kit 300 can include a power actuator communications cable 76 having a power actuator housing 72 located at the first end 73 of the communications cable 76 and a connector 78 located at the second end 77 of the communications cable 76 to establish electrical communication between the motor drive 86 and an actuator control 74 located in the power actuator housing 72 at the first end 73 of the communications cable 76. The actuator control 74 may comprise dual push buttons. In addition to the drive mechanism 80, power cord 14 and the power actuator 70, the exemplary pre-packaged power conversion kit 300 can also include a front bracket 85 that is attachable to a front strut of the base and a rear bracket 89 that is attachable to a rear strut of the base, an angle bracket 90 that is attachable to a drive strut 69 and which includes provision for coupling with the second ends of the swing arms 92, and any fasteners 310 tooling 320 and instructions 330 necessary to perform the conversion. In line with the alternative embodiment of this disclosure discussed above, the pre-packaged conversion kits 300 may omit the front bracket 85 and rear bracket 89 in place of a drive mechanism 80 having mounts predisposed on the front and rear thereof.

The foregoing description generally illustrates and describes various embodiments of the present invention. It will be understood by those skilled in the art that various changes can be made to the above-discussed construction without departing from the spirit and scope of the present invention as disclosed herein, and it is intended that all matter contained in the above description or shown in the accompanying drawings shall be interpreted as illustrative and not in a limiting sense. Furthermore, the scope of the present disclosure shall be construed to cover various modifications, combinations, alterations, etc. of the above-described embodiments and shall be considered to be within the scope of the present invention. Furthermore, various features and characteristics of the present invention as discussed herein may be selectively interchanged and applied to other illustrated and non-illustrated embodiments of the invention.

The invention claimed is:

1. A component kit for converting a recliner from manual actuation to powered actuation, the recliner including a frame, a recliner mechanism having a base coupled to the frame and a hinged linkage movably coupled to the base, and a manual actuator mounted within a control aperture in the frame and configured to release the hinged linkage to move from a first position to a second position relative to the base and frame by way of occupant-applied force, the component kit including:
   a drive mechanism configured to actuate the hinged linkage from the first position to the second position upon connection to a source of electrical power;
   means for coupling the drive mechanism to the base;

an electrical transformer connectable between the drive mechanism and a source of electrical power and configured to provide electrical power to the drive mechanism; and a power actuator connectable with the drive mechanism and configured to activate the drive mechanism.

2. The component kit of claim 1, wherein the power actuator is sized and configured for mounting within the control aperture of the frame.

3. The component kit of claim 1, wherein the drive mechanism comprises:

a slide rail;

a swing arm having a first end movably coupled to the slide rail and a second end adapted for connection to the hinged linkage of the recliner mechanism;

a motor drive unit; and a drive screw proximate the slide rail and coupled to the motor drive unit and the first end of the swing arm, wherein activation of the motor drive unit rotates the drive screw to cause the first end of the swing arm to move relative to the slide rail.

4. The component kit of claim 3, further including an angle bracket attachable to a strut of the hinged linkage and having provision for coupling with the second end of the swing arm.

5. The component kit of claim 3, wherein the motor drive unit comprises a motor drive and a gear reducer.

6. The component kit of claim 1, further comprising:

a plug;

a power cord; and an electrical cable for connecting the source of electrical power to the transformer to the drive mechanism.

7. The component kit of claim 1, wherein the power actuator further comprises:

a power actuator communications cable having a power actuator housing located at a first end of the power actuator communications cable and a connector located at a second end of the power actuator communications cable; and an actuator control located in the power actuator housing at the first end of the power actuator communications cable.

8. The component kit of claim 1 further comprising instructions for converting the recliner.

* * * * *